(12) United States Patent
Di Perna et al.

(10) Patent No.: US 9,732,660 B2
(45) Date of Patent: Aug. 15, 2017

(54) INTEGRATED SENSOR-CATALYST

(71) Applicant: GM GLOBAL TECHNOLOGY OPERATIONS LLC, Detroit, MI (US)

(72) Inventors: Luciano Nunziato Di Perna, Troy, MI (US); Jianwen Li, West Bloomfield, MI (US); Charles E. Dean, Clarkston, MI (US); Rahul Mital, Rochester Hills, MI (US); David B. Brown, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/955,653

(22) Filed: Dec. 1, 2015

(65) Prior Publication Data

US 2017/0152786 A1 Jun. 1, 2017

(51) Int. Cl.
| | |
|---|---|
| *F01N 3/00* | (2006.01) |
| *F01N 13/00* | (2010.01) |
| *F01N 3/20* | (2006.01) |
| *F02B 9/02* | (2006.01) |

(52) U.S. Cl.
CPC .......... *F01N 13/008* (2013.01); *F01N 3/206* (2013.01); *F01N 3/2006* (2013.01); *F01N 3/2066* (2013.01); *F02B 9/02* (2013.01); *F01N 2370/02* (2013.01)

(58) Field of Classification Search
USPC .......................... 60/274, 276, 277, 286, 300
See application file for complete search history.

(56) References Cited

U.S. PATENT DOCUMENTS

| | | | | |
|---|---|---|---|---|
| 5,486,336 | A  * | 1/1996 | Dalla Betta | G01N 33/0037 422/90 |
| 6,550,310 | B1 * | 4/2003 | Liu | G01N 33/004 73/25.01 |
| 8,206,991 | B2 * | 6/2012 | Ruiz | G01N 25/20 436/145 |
| 9,133,748 | B2 * | 9/2015 | Hashida | F01N 3/023 |
| 9,506,392 | B2 * | 11/2016 | Fix | F01N 13/08 |
| 2011/0197571 | A1 * | 8/2011 | Visser | G01N 27/4077 60/311 |
| 2013/0031954 | A1 * | 2/2013 | Yoshioka | F01N 13/008 73/23.31 |

* cited by examiner

*Primary Examiner* — Binh Q Tran
(74) *Attorney, Agent, or Firm* — Quinn IP Law

(57) ABSTRACT

An integrated sensor-catalyst is disclosed for an after-treatment (AT) system used to filter an exhaust gas flow emitted by an internal combustion engine. The integrated sensor-catalyst includes a sensor element configured to detect a parameter of the exhaust gas flow. The integrated sensor-catalyst also includes a micro-catalyst element configured to filter a pollutant from the exhaust gas flow. Additionally, the integrated sensor-catalyst includes a housing configured to hold the sensor element and the micro-catalyst element and fix the micro-catalyst element relative to the sensor element such that the micro-catalyst element is arranged and maintained in the exhaust gas flow upstream of the sensor element. A vehicle including such an AT system with the integrated sensor-catalyst is also disclosed.

20 Claims, 4 Drawing Sheets

INTEGRATED SENSOR-CATALYST

TECHNICAL FIELD

The present disclosure is drawn to an integrated sensor-catalyst for an exhaust system of an internal combustion engine.

BACKGROUND

Various exhaust after-treatment devices have been developed to effectively limit exhaust emissions from internal combustion engines. Such after-treatment devices are typically combined into a dedicated after-treatment system as part of the engine's exhaust system.

A modern diesel engine after-treatment system generally includes a diesel particulate filter (DPF) for collecting and disposing of the sooty particulate matter or soot emitted by the diesel engine prior to the exhaust gas being discharged to the atmosphere. A typical DPF contains precious metals, such as platinum and/or palladium, which serve as catalysts to further oxidize the sooty particulate matter present in the exhaust stream.

Prior to the sooty particulate matter being trapped by the DPF, various other devices arranged in the exhaust system may come into contact with soot in the exhaust gas stream. Operation of such devices may be negatively affected as the sooty particulate matter is collected thereon.

SUMMARY

An integrated sensor-catalyst is disclosed for an after-treatment (AT) system used to filter an exhaust gas flow emitted by an internal combustion engine. The integrated sensor-catalyst includes a sensor element configured to detect a parameter of the exhaust gas flow. The integrated sensor-catalyst also includes a micro-catalyst element configured to filter a pollutant from the exhaust gas flow. Additionally, the integrated sensor-catalyst includes a housing configured to hold the sensor element and the micro-catalyst element and fix the micro-catalyst element relative to the sensor element such that the micro-catalyst element is arranged and maintained in the exhaust gas flow upstream of the sensor element.

The sensor element may be configured to detect a temperature of the exhaust gas flow.

The internal combustion engine may be a compression-ignition engine.

The pollutant may be a sooty particulate matter emitted by the engine.

The micro-catalyst element may include a precious metal activated by elevated temperature of the exhaust gas flow. Such precious metal can be platinum and/or palladium.

The engine can be fluidly connected to an exhaust passage configured to carry the emitted exhaust gas flow. The housing may include a feature configured to detachably connect the integrated sensor-catalyst to the exhaust passage.

At least one of the housing may include a first feature configured to indicate orientation of the micro-catalyst element in the exhaust gas flow upstream of the sensor element.

The exhaust passage may include a second feature. Alignment of the first feature relative to the second feature may be indicative of the orientation of the integrated sensor-catalyst at the exhaust passage, and therefore of micro-catalyst element in the exhaust gas flow upstream of the sensor element.

The integrated sensor-catalyst may additionally include a heating element fixed and retained by the housing proximate to the micro-catalyst element. The heating element can be configured to regenerate the micro-catalyst element.

A vehicle including such an AT system with the integrated sensor-catalyst is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
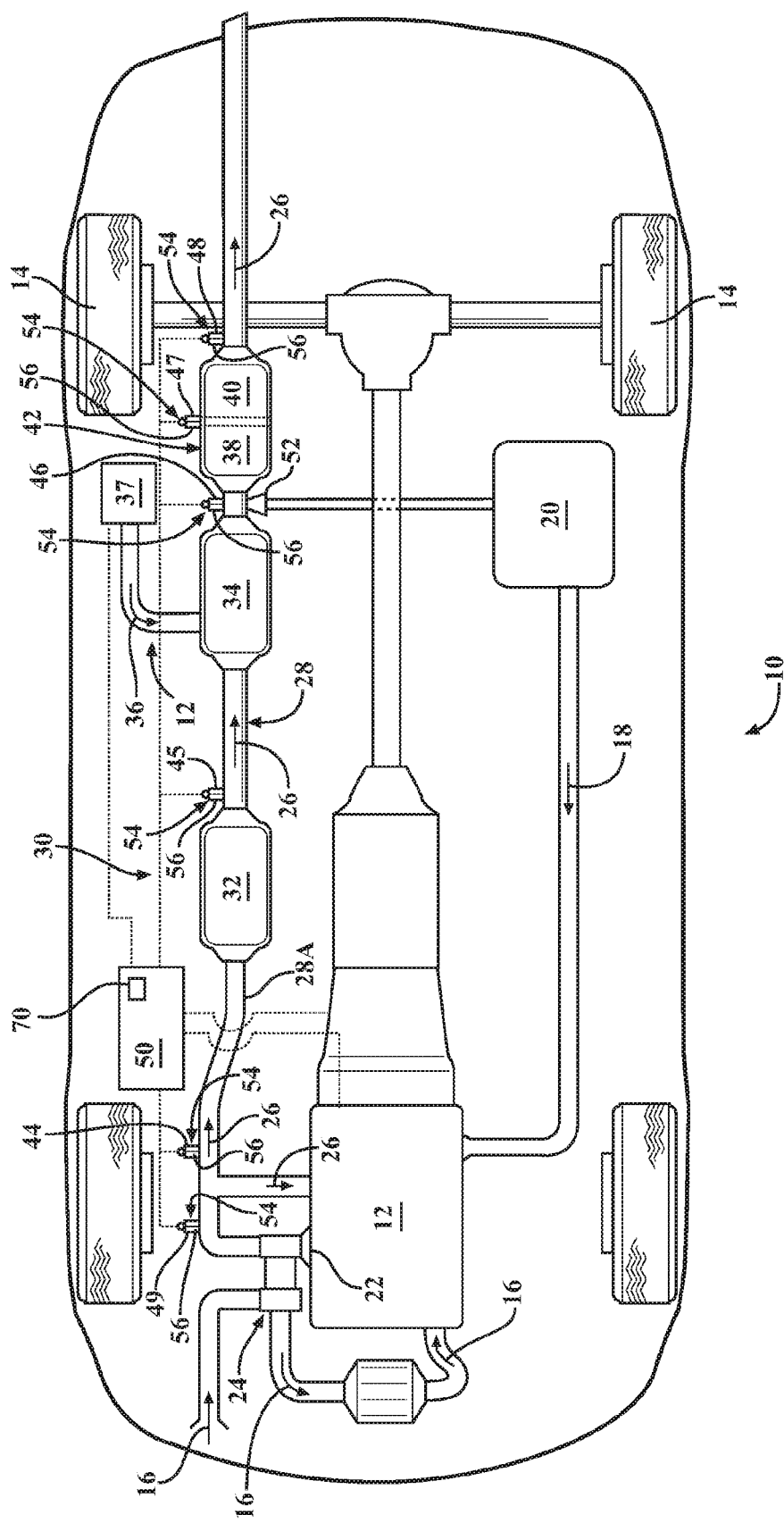
FIG. 1 is a schematic plan view of a vehicle having a diesel engine connected to an exhaust system having an after-treatment (AT) system employing an integrated sensor-catalyst.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. The internal combustion engine 12 may be configured as a spark-ignition or gasoline engine in which a specific amount of ambient air flow 16 is mixed with a metered amount of fuel 18 supplied from a fuel tank 20 and the resultant air-fuel mixture is ignited via a dedicated device, such as a spark plug (not shown), inside the engine's cylinders (also not shown, but understood by those skilled in the art). The internal combustion engine 12 may also be configured as a compression-ignition or diesel engine in which ambient air flow 16 is mixed with a metered amount of fuel 18 supplied from the fuel tank 20 and the resultant air-fuel mixture is compressed inside the engine's cylinders. Although the present disclosure is applicable to both engine types, the ensuing description will primarily focus on its application to diesel engines.

As shown, the engine 12 includes an exhaust manifold 22 and may include a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Accordingly, the engine 12 is fluidly connected to the exhaust system 28. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes an exhaust gas after-treatment (AT) system 30 operating as part of the exhaust system 28 and employing various exhaust after-treatment devices configured to filter pollutants from the exhaust gas flow 26. In a diesel embodiment of the engine 12, the AT system 30 includes a number of exhaust after-treatment devices configured to methodically remove from the exhaust gas flow 26 particulate matter (PM) or soot, i.e., largely carbonaceous byproducts and emission constituents of engine combustion. As shown, the AT system 30 includes a diesel oxidation catalyst (DOC) 32. The primary function of the DOC 32 is reduction of carbon monoxides (CO) and non-methane hydrocarbons (NMHC). Additionally, the DOC 32 is configured to generate nitrogen dioxide ($NO_2$), which is required by a selective catalytic reduction (SCR) catalyst 34 that is arranged downstream of the DOC 32. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, although not shown, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert $NO_x$ into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is injected into the exhaust gas flow 26 from a reservoir 37 at a location in the AT system 30 that is downstream of the DOC 32 and upstream of the SCR catalyst 34. Accordingly, the DEF 36 accesses the SCR catalyst 34 as the exhaust gas flow 26 flows through the SCR catalyst. An inner surface of the SCR catalyst 34 includes a wash coat that serves to attract the DEF 36 such that the DEF may interact with the exhaust gas flow 26 in the presence of NO and $NO_2$, and generate a chemical reaction to reduce $NO_x$ emissions from the engine 12.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 may be housed inside a single canister 42, as shown in FIG. 1. The DOC 38 is configured to oxidize hydrocarbons and carbon monoxide present in the exhaust gas flow 26 into carbon dioxide ($CO_2$) and water. The DPF 40 is configured to collect and dispose of the particulate matter emitted by the engine 12 prior to the exhaust gas flow 26 being discharged to the atmosphere. Accordingly, the DPF 40 acts as a trap for removing the particulate matter, specifically, soot, from the exhaust flow. Similar to the DOC 32 described above, each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

The AT system 30 may also include a number of sensor elements, each configured to detect a specific parameter or characteristic of the exhaust gas flow 26. Such sensor elements can be configured as temperature probes 44, 45, 46, 47, and 48 intended to sense temperature of the exhaust gas flow 26 at various points downstream of the engine 12. Such a sensor element can also be configured as a probe 49 configured to detect a lambda ($\lambda$) parameter in the exhaust gas flow 26. As understood by those skilled in the art, a lambda ($\lambda$) parameter is used as an indicator of proportion of fuel to air in an exhaust gas flow 26 from an internal combustion engine. A $\lambda$ parameter having a value of 1.0 defines a mixture having a stoichiometric fuel-air ratio; a $\lambda$ parameter having a value greater than 1.0 defines a lean mixture; and a $\lambda$ parameter having a value less than 1.0 defines a mixture that is fuel-rich. Prior to the removal of soot from the exhaust gas flow 26 by the DPF 40, such soot can foul the foregoing sensor elements 44-49 and interfere with detection of the respective exhaust gas flow parameters.

The AT system 30 may also include a controller 50. According to the disclosure, the controller 50 is configured to regulate operation of the engine 12, as well as operation of the exhaust after-treatment devices, namely the DOC 32, SCR catalyst 34, DOC 38, and DPF 40. Additionally, when present, each of the probes 44, 45, 46, 47, 48, and 49 is in electrical communication with the controller 50 in order to facilitate regulation of the AT system 30. For example, the controller 50 can be configured to regulate operation of the engine 12 to influence operation of the AT system 30 in response to the exhaust gas temperatures detected by the temperature probes 44, 45, 46, 47, 48. Additionally, the controller 50 can be configured to vary or adjust an amount of diesel fuel injected by a dedicated injector 52 into the exhaust gas flow 26 upstream of the DPF 40 in response to the $\lambda$ parameter detected by the probe 49 during regeneration of the DPF.

The controller 50 may include a central processing unit (CPU) configured to regulate operation of an internal combustion engine 12 (shown in FIG. 1), a hybrid-electric powertrain (not shown), or other alternative types of powerplants, as well as other vehicle systems, or a dedicated controller. In order to appropriately control operation of the AT system 30, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

Figure 2:
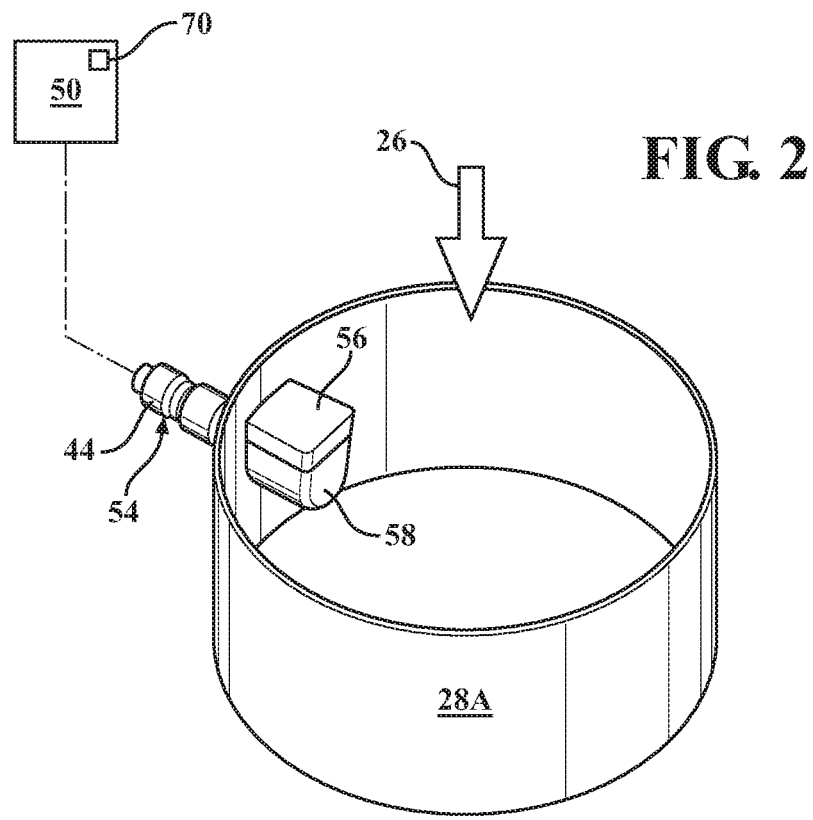
FIG. 2 is a schematic perspective view of the integrated sensor-catalyst arranged on an exhaust passage of the AT system shown in FIG. 1.
Figure 3:
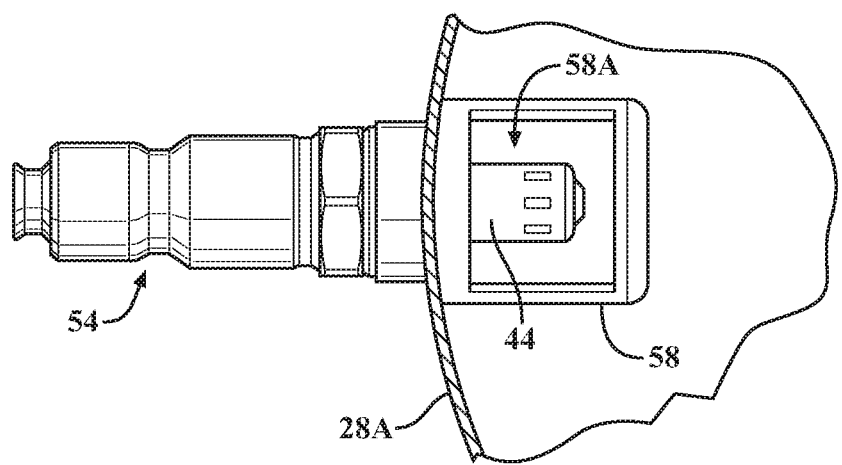
FIG. 3 is schematic partially cross-sectional plan view of the integrated sensor-catalyst shown in FIG. 2, illustrating an opening in sensor-catalyst housing.
Figure 4:
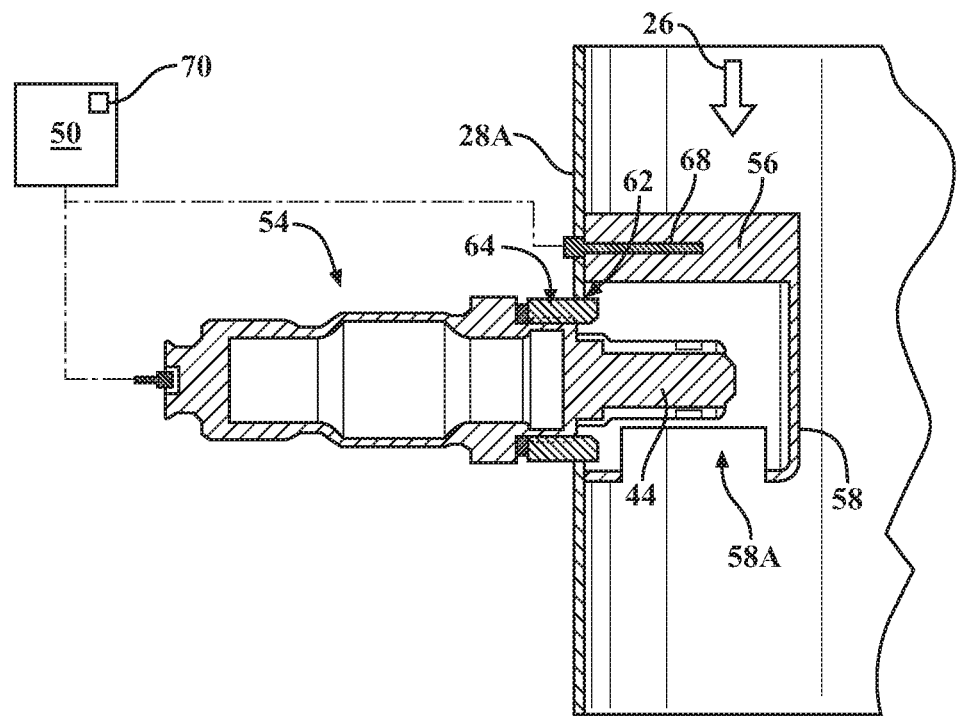
FIG. 4 is a schematic cross-sectional side view of the integrated sensor-catalyst shown in FIG. 2.
Figure 5:
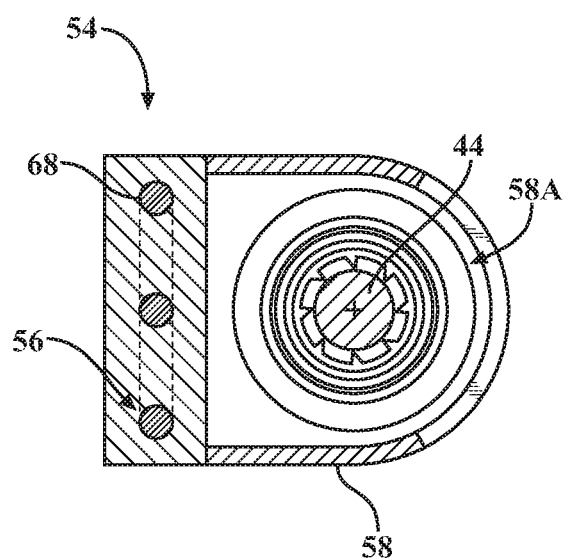
FIG. 5 is a schematic cross-sectional bottom view of the integrated sensor-catalyst shown in FIG. 2.
Figure 6:
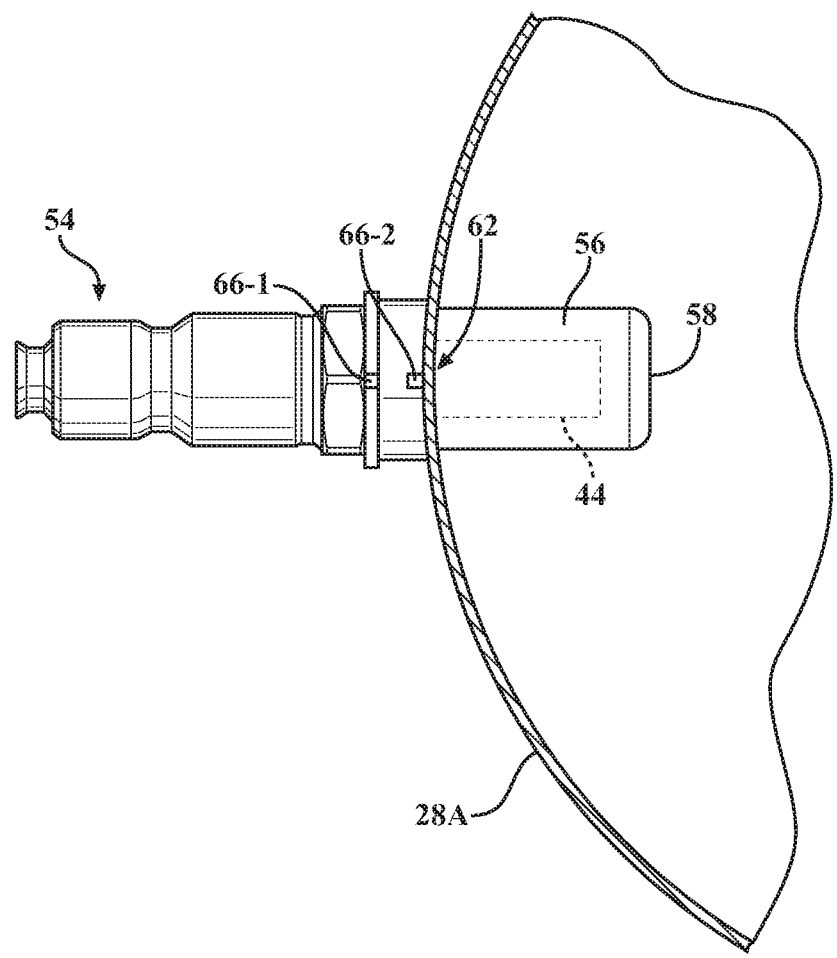
FIG. 6 is schematic partially cross-sectional plan view of an alternative embodiment of the integrated sensor-catalyst, illustrating a feature indicating orientation of the integrated sensor-catalyst at the exhaust passage.

According to the disclosure, the AT system 30 also includes an integrated sensor-catalyst 54. The integrated sensor-catalyst 54 also includes a sensor element configured to detect a parameter of the exhaust gas flow 26. Although, for exemplary purposes, in FIG. 2 the integrated sensor-catalyst 54 is illustrated as including the probe 44 in position of the constituent sensor element, any of the probes such as 44, 45, 46, 47, 48, and 49 can be incorporated as a constituent of the integrated sensor-catalyst. The integrated sensor-catalyst 54 also includes a micro-catalyst element 56 configured to filter a pollutant, such as the sooty particulate matter emitted by the engine 12, from the exhaust gas flow 26. The micro-catalyst element 56 may include a precious metal activated by elevated temperature of the exhaust gas flow 26. Specifically, the micro-catalyst element 56 may be configured similar to the DOC 32 but on a smaller scale, wherein the employed precious metal may be platinum and/or palladium.

As shown in FIGS. 2-5, the micro-catalyst element 56 is positioned upstream of the respective sensor element, the probe 44, in order to minimize possibility of the sensor element being fouled by soot in the exhaust gas flow 26. In turn, as the fouling of the sensor element by the soot is minimized, the interference of such soot with detection of the particular exhaust gas flow 26 parameter by the sensor element is also reduced. The integrated sensor-catalyst 54 also includes a housing 58 configured to hold and retain the sensor element and the micro-catalyst element 56 and fix the micro-catalyst element relative to and spaced apart from the sensor element such that the micro-catalyst element is arranged and maintained in the exhaust gas flow 26 upstream of the sensor element. The exhaust system 28 includes an exhaust passage 28A configured to carry the emitted exhaust gas flow 26, and wherein the integrated sensor-catalyst 54 is mounted to the exhaust passage. The housing 58 defines an opening 58A configured to release the exhaust gas flow 26, after the gas flow had passed initially through the micro-catalyst element 56 and then the sensor element, back into the exhaust passage 28A.

The assembly and integration of the sensor-catalyst 54 can be initiated with the micro-catalyst element 56 being mounted inside the housing 58. Thereafter, the housing 58 can be mounted at an aperture 62 defined by the exhaust passage in a predetermined orientation such that, in the final assembly, the micro-catalyst element 56 becomes positioned upstream of the respective sensor element. Specifically, the housing 58 can be welded to an inside surface 60 of the exhaust passage 28A. Following, the mounting of the housing 58 to the exhaust passage 28A, the sensor element, such as any of the probes 44, 45, 46, 47, 48, and 49, can be inserted through the aperture 62 and fixed to the exhaust passage. Specifically, the housing 58 can include an attachment means 64, such as complementary threads (shown in FIG. 4) that become fixed to the exhaust passage 28A, configured to facilitate a detachable connection of the sensor element to the housing.

Alternatively, as shown in Figure, the integrated sensor-catalyst 54 can be preassembled with the micro-catalyst element 56 mounted inside the housing 58 and the micro-catalyst element 56 fixed thereto prior to the integrated sensor-catalyst being mounted, such as welded or threadably connected, to the exhaust passage 28A. In such an embodiment, the exhaust passage 28A and/or the housing 58 may include a respective feature configured to indicate and/or set orientation of the integrated sensor-catalyst 54 at the exhaust passage 28A and the micro-catalyst element 56 being in the exhaust gas flow 26 upstream of the sensor element. The respective feature may include a first feature 66-1 arranged on the housing 58 and a second feature 66-2 arranged on the exhaust passage 28A. For example, the first and second features 66-1, 66-2 can be alignable identification marks, or a key-way employed with a complementary engageable pin. Accordingly, alignment of the first feature 66-1 relative to the second feature 66-2 can be indicative of the orientation of the micro-catalyst element 56 in the exhaust gas flow 26 upstream of the sensor element, such as the probe 44. Additionally, in an embodiment where the integrated sensor-catalyst 54 is threadably connected to the exhaust passage 28A, the first feature 66-1 can serve as a positive stop (not shown) against the second feature 66-2, thus locating the integrated sensor-catalyst such that the micro-catalyst element 56 is arranged in the exhaust gas flow 26 upstream of the sensor element.

The integrated sensor-catalyst may additionally include a heating element 68. The heating element 68 may be fixed and retained by the housing 58 proximate to the micro-catalyst element 56. The heating element 68 can be configured to regenerate the micro-catalyst element 56 when such becomes full of sooty particulate matter. The heating element 68 can be in electronic communication with the controller 50. The controller may be programmed to regenerate the micro-catalyst element 56 and burn off any soot collected thereon at a predetermined timeframe 70. Such predetermined timeframe 70 can be determined empirically during testing and verification of performance of the AT system 30, for example when the signal from the specific sensor element, such as the probes 44, 45, 46, 47, 48, or 49, begins to diverge from indicating the actual exhaust parameter, as verified by computational or other empirical means.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An integrated sensor-catalyst for an after-treatment (AT) system used to filter an exhaust gas flow emitted by an internal combustion engine, the integrated sensor-catalyst comprising:
   a sensor element configured to detect a parameter of the exhaust gas flow;
   a micro-catalyst element configured to filter a pollutant from the exhaust gas flow; and
   a housing configured to hold the sensor element and the micro-catalyst element and fix the micro-catalyst element relative to and spaced apart from the sensor element such that the micro-catalyst element is arranged and maintained in the exhaust gas flow upstream of the sensor element.

2. The integrated sensor-catalyst of claim 1, wherein the sensor element is configured to detect a temperature of the exhaust gas flow.

3. The integrated sensor-catalyst of claim 1, wherein the internal combustion engine is a compression-ignition engine.

4. The integrated sensor-catalyst of claim 3, wherein the pollutant is a sooty particulate matter emitted by the engine.

5. The integrated sensor-catalyst of claim 4, wherein the micro-catalyst element includes a precious metal activated by elevated temperature of the exhaust gas flow.

6. The integrated sensor-catalyst of claim 5, wherein the precious metal is at least one of platinum and palladium.

7. The integrated sensor-catalyst of claim 1, wherein the engine is fluidly connected to an exhaust passage configured to carry the emitted exhaust gas flow, and wherein the housing includes a feature configured to detachably connect the integrated sensor-catalyst to the exhaust passage.

8. The integrated sensor-catalyst of claim 7, wherein the housing includes a first feature configured to indicate orientation of the micro-catalyst element in the exhaust gas flow upstream of the sensor element.

9. The integrated sensor-catalyst of claim 8, wherein the exhaust passage includes a second feature, and wherein alignment of the first feature relative to the second feature is indicative of the orientation of the micro-catalyst element in the exhaust gas flow upstream of the sensor element.

10. The integrated sensor-catalyst of claim 1, further comprising a heating element fixed and retained by the housing proximate to the micro-catalyst element, wherein the heating element is configured to regenerate the micro-catalyst element.

11. A vehicle comprising:
an internal combustion engine; and
an after-treatment (AT) system operatively connected to the internal combustion engine for filtering an exhaust gas flow emitted thereby, the AT system including:
an exhaust passage fluidly connected to the engine and configured to carry the emitted exhaust gas flow;
an integrated sensor-catalyst comprising:
a sensor element configured to detect a parameter of the exhaust gas flow;
a micro-catalyst element configured to filter a pollutant from the exhaust gas flow; and
a housing configured to hold the sensor element and the micro-catalyst element and fix the micro-catalyst element relative to and spaced apart from the sensor element such that the micro-catalyst element is arranged and maintained in the exhaust gas flow upstream of the sensor element.

12. The vehicle of claim 11, wherein the sensor element is configured to detect a temperature of the exhaust gas flow.

13. The vehicle of claim 11, wherein the internal combustion engine is a compression-ignition engine.

14. The vehicle of claim 13, wherein the pollutant is a sooty particulate matter emitted by the engine.

15. The vehicle of claim 14, wherein the micro-catalyst element includes a precious metal activated by elevated temperature of the exhaust gas flow.

16. The vehicle of claim 15, wherein the precious metal is at least one of platinum and palladium.

17. The vehicle of claim 11, wherein the engine is fluidly connected to an exhaust passage configured to carry the emitted exhaust gas flow, and wherein the housing includes a feature configured to detachably connect the integrated sensor-catalyst to the exhaust passage.

18. The vehicle of claim 17, wherein at least one of the housing and the exhaust passage includes a respective feature configured to indicate orientation of the micro-catalyst element in the exhaust gas flow upstream of the sensor element.

19. The vehicle of claim 18, wherein the exhaust passage includes a second feature, and wherein alignment of the first feature relative to the second feature is indicative of the orientation of the micro-catalyst element in the exhaust gas flow upstream of the sensor element.

20. The vehicle of claim 11, further comprising a heating element fixed and retained by the housing proximate to the micro-catalyst element, wherein the heating element is configured to regenerate the micro-catalyst element.

* * * * *